(12) United States Patent
Zhang et al.

(10) Patent No.: US 11,782,262 B2
(45) Date of Patent: Oct. 10, 2023

(54) OPTICALLY ENHANCED LIGHT CONVERTER

(71) Applicant: MATERION CORPORATION, Mayfield Heights, OH (US)

(72) Inventors: David Zhang, Shanghai (CN); Ying Cao, Shanghai (CN); Lennon Li, Shanghai (CN); Shengyuan Bai, Shanghai (CN)

(73) Assignee: MATERION CORPORATION, Mayfield Heights, OH (US)

( * ) Notice: Subject to any disclaimer, the term of this patent is extended or adjusted under 35 U.S.C. 154(b) by 190 days.

(21) Appl. No.: 16/074,975

(22) PCT Filed: Mar. 2, 2016

(86) PCT No.: PCT/CN2016/075313
§ 371 (c)(1),
(2) Date: Aug. 2, 2018

(87) PCT Pub. No.: WO2017/147816
PCT Pub. Date: Sep. 8, 2017

(65) Prior Publication Data
US 2019/0056586 A1    Feb. 21, 2019

(51) Int. Cl.
*G02B 26/00*    (2006.01)
*H04N 9/31*    (2006.01)
*B32B 3/26*    (2006.01)

(52) U.S. Cl.
CPC ............ *G02B 26/008* (2013.01); *B32B 3/263* (2013.01); *H04N 9/3114* (2013.01); *Y10T 428/24364* (2015.01); *Y10T 428/24372* (2015.01)

(58) Field of Classification Search
CPC ...... G02B 26/008; H04N 9/3114; B32B 3/30; B32B 3/00; Y10T 428/24355;
(Continued)

(56) References Cited

U.S. PATENT DOCUMENTS 8,915,597 B2    12/2014    Kitano et al.
2010/0079867 A1*    4/2010    Wakizaka ............ G02B 5/0221
                                                                                        359/601
(Continued)

FOREIGN PATENT DOCUMENTS

CN    101836160 A    9/2010
CN    101836160 B    2/2012
(Continued)

OTHER PUBLICATIONS

International Search Report dated Nov. 29, 2016 issued in PCT/CN2016-075313.
(Continued)

*Primary Examiner* — Nancy R Johnson
(74) *Attorney, Agent, or Firm* — TUCKER ELLIS LLP

(57) ABSTRACT

A light converter and method of manufacture is provided. A light conversion layer (301), comprising light conversion particles (301*a*) in a binding material (301*b*) is provided for generating emission light from excitation light incident on the light conversion layer (301). A planarization layer (304) is on a surface of the light conversion layer (301) and at least one optical coating (305) is part of or on a surface of the planarization layer (304) that is relatively smooth in comparison with the surface of the light conversion layer (301).

17 Claims, 6 Drawing Sheets

(58) Field of Classification Search
CPC ..... Y10T 428/24364; Y10T 428/24372; Y10T 428/2438
USPC .................................................. 428/141, 143
See application file for complete search history.

(56) References Cited

U.S. PATENT DOCUMENTS

| | | | |
|---|---|---|---|
| 2010/0110551 | A1 | 5/2010 | Lamansky et al. |
| 2011/0250392 | A1* | 10/2011 | Woody ................ H01L 51/0097 428/141 |
| 2011/0317171 | A1 | 12/2011 | Emtman et al. |
| 2015/0003042 | A1* | 1/2015 | Strauß ...................... F21V 7/22 362/84 |
| 2015/0138643 | A1 | 5/2015 | Nomura et al. |
| 2015/0276177 | A1 | 10/2015 | Maeda et al. |
| 2015/0316839 | A1 | 11/2015 | Jeoung et al. |
| 2016/0359141 | A1* | 12/2016 | Yoon ................... H01L 51/5253 |
| 2017/0146219 | A1* | 5/2017 | Li ....................... G02B 5/0284 |
| 2017/0168379 | A1* | 6/2017 | Hashizume ........... C03C 14/006 |

FOREIGN PATENT DOCUMENTS

| | | |
|---|---|---|
| CN | 203489181 U | 3/2014 |
| CN | 203721767 U | 7/2014 |
| CN | 104508533 A | 4/2015 |
| CN | 104676491 A | 6/2015 |
| CN | 105027257 A | 11/2015 |
| DE | 20 2016 101296 U1 | 3/2016 |
| DE | 202016101296 U1 | 3/2016 |
| EP | 2 645 433 A2 | 10/2013 |
| JP | H06 131988 A | 5/1994 |
| JP | H06131988 A | 5/1994 |
| JP | 2001242451 A | 9/2001 |
| JP | 2010108965 A | 5/2010 |
| JP | 2011123380 A * | 6/2011 |
| JP | 2012018162 A | 1/2012 |
| JP | 2013 197259 A | 9/2013 |
| JP | 2013197259 A | 9/2013 |
| JP | 2014501948 A | 1/2014 |
| JP | 2014031488 A | 2/2014 |
| JP | 2014507013 A | 3/2014 |
| JP | 2014132515 A * | 7/2014 ......... C09K 11/7736 |
| JP | 20140132515 A | 7/2014 |
| JP | 2015-1709 | 1/2015 |
| JP | 2015 001709 A | 1/2015 |
| JP | 2015001709 A | 1/2015 |
| JP | 2015-51396 | 3/2015 |
| JP | 2015-51404 | 3/2015 |
| JP | 2015517173 A | 6/2015 |
| JP | 2015162280 A | 9/2015 |
| JP | 2015-211058 | 11/2015 |
| JP | 2016 170357 A | 9/2016 |
| JP | 2016 170359 | 9/2016 |
| JP | 2016170357 A | 9/2016 |
| JP | 2016170359 A | 9/2016 |
| TW | 2010 31034 A | 8/2010 |
| TW | 201031034 A | 8/2010 |
| TW | 2015 41669 A | 11/2015 |
| TW | 201541669 A | 11/2015 |
| WO | WO 2012 077021 A1 | 6/2012 |
| WO | 2014016574 A1 | 1/2014 |
| WO | 2014030342 A1 | 2/2014 |
| WO | 2017100996 A1 | 6/2017 |

OTHER PUBLICATIONS

Taiwan Search Report for Taiwan Application No. 105111239 dated Oct. 3, 2019.
Partial Extended European Search Report for European Application No. 16892007.2 dated Oct. 7, 2019.
Office Action from corresponding Chinese Application No. 201680082899.3, dated Sep. 14, 2020.
International Report on Patentability dated Sep. 4, 2018 for Application Serial No. PCT/CN2016/075313 (7 pages).
Chinese Search Report dated Sep. 4, 2020 for Application Serial No. CN201680082899 (2 pages).
European Search Report and dated Sep. 20, 2019 for Application Serial No. EP16892007 (8 pages).
Japanese Search Report dated Oct. 16, 2019 for Application Serial No. JP2018544164 (20 pages).

* cited by examiner

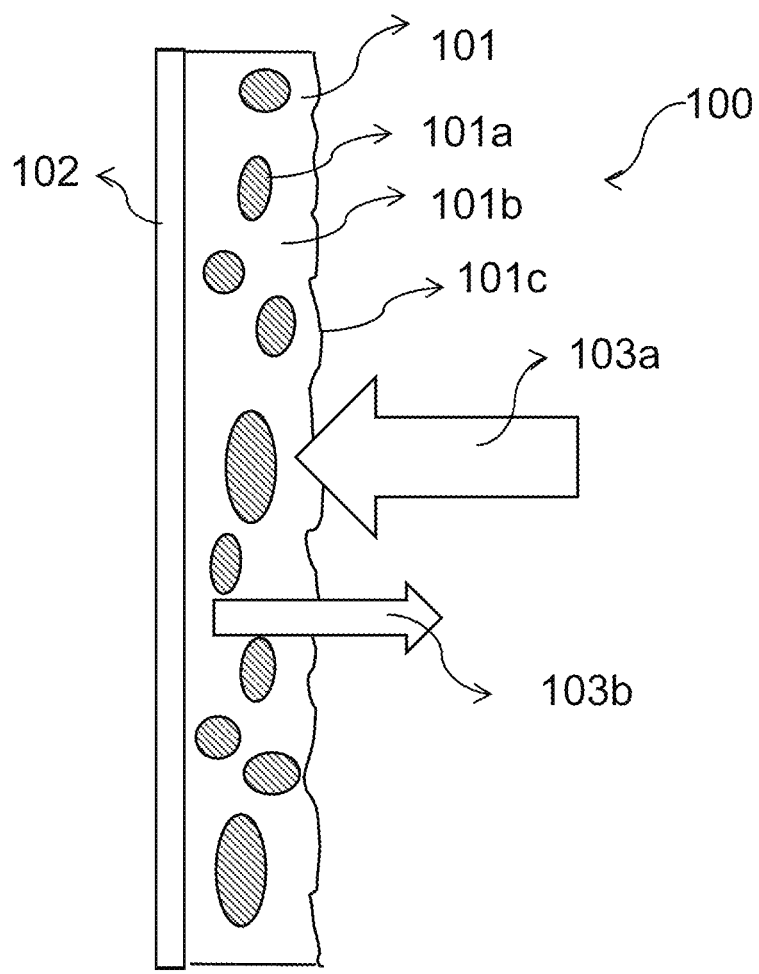
Figure 1 – PRIOR ART

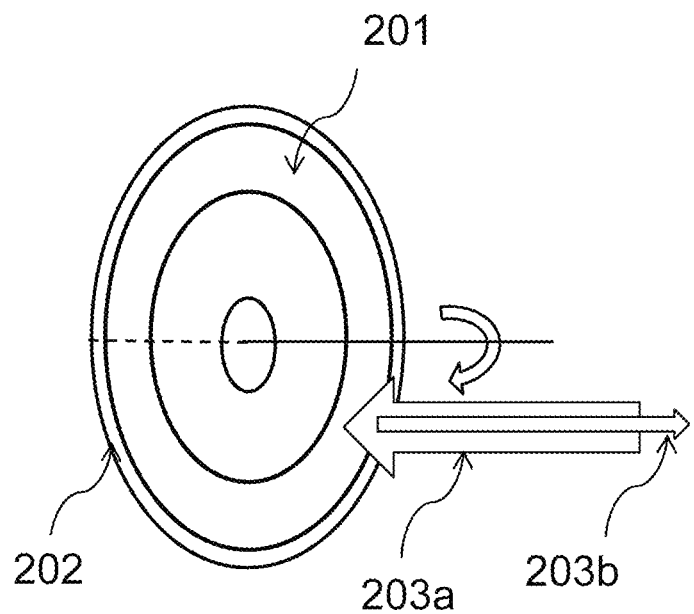
Figure 2a – PRIOR ART
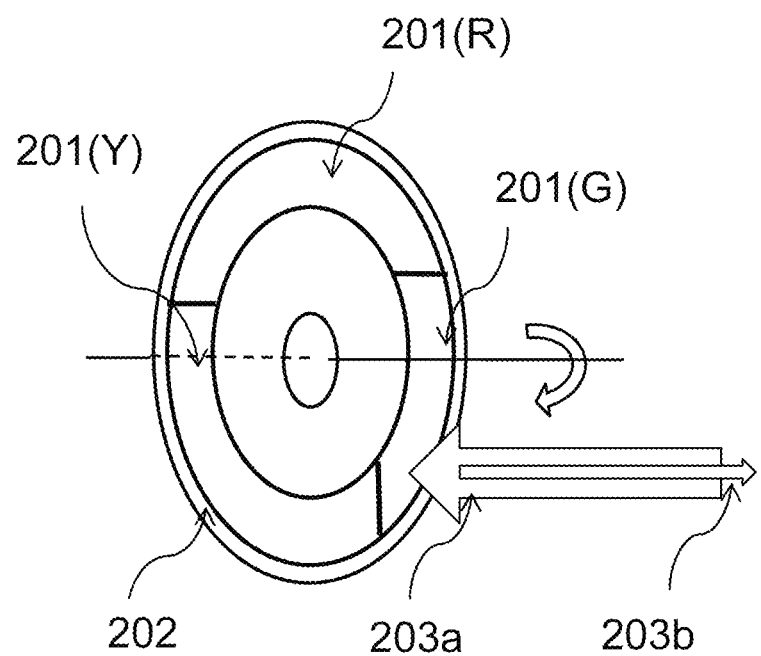
Figure 2b – PRIOR ART

OPTICALLY ENHANCED LIGHT CONVERTER

This application is a 371 of PCT Patent Application Serial No. PCT/CN2016/075313, filed Mar. 2, 2016.

TECHNICAL FIELD OF THE INVENTION

The present invention relates to a light converter comprising a solid-state light conversion material, which may form part of an optical device such as a phosphor wheel. A method of manufacturing a light converter is also provided.

BACKGROUND TO THE INVENTION

Light conversion (or wavelength conversion) materials such as phosphors are used in a variety of applications, especially in optical devices. A schematic depiction of a cross-section of an existing exemplary light converter 100 is shown in FIG. 1. This comprises: a light conversion layer 101; and a highly reflective coating 102. The light conversion layer 101 conventionally comprises phosphor particles (powder) 101*a* in a polymer binder, such as cured silicone glue 101*b*. This is known as a phosphor-in-silicone (PIS) type. The phosphor particles 101*a* are dispersed in liquid transparent silicone 101*b* by dispensing, screen printing or another coating method and then thermally cured and solidified. The light conversion layer 101 has a rough surface 101*c* on its side opposite to that on which the highly reflective coating 102 is provided.

Excitation light 103*a* is incident on the light conversion layer 101 and the phosphor powder 101*a* converts this into emission light. The highly reflective coating 102 captures this emission light from all possible directions and reflects it, so that the emission light 103*b* all travels in the opposite direction to the excitation light 103*a*. Thus, the light converter 100 is of a reflective type. It is also known to provide a light conversion layer 101 without highly reflective coating 102 and such light converters are of a transmissive type.

One application of such a light converter is a phosphor wheel, which is an optical device for generating emission light of one or typically multiple different wavelengths from excitation light of a single light source (typically of a narrow range of wavelengths). An example phosphor wheel is described in WO-2014/016574, having common inventorship.

Referring next to FIGS. 2*a* and 2*b*, there is shown first and second examples respectively of known phosphor wheel structures in a schematic form. The two examples have similar features and where the same features are shown, identical reference numerals have been used. A light converter 201 is provided on a disc substrate 202. The light converter 201 is of PIS type, in accordance with FIG. 1. The light converter 201 is formed as a single colour phosphor ring (in a concentric pattern, as shown in FIG. 2*a*) or multiple colour segments 201(R) (red), 201(Y) (yellow) and 201(G) (green), each of which is used to generate light with a specific colour (shown in FIG. 2*b*). The light converter 201 converts the light spectrum from excitation light of a first range of spectral wavelength to emission (or re-emission) light of a second, different range of spectral wavelengths. Excitation light 203*a* (source light, for example blue light) causes the generation of emission light 203*b* (for instance, yellow light, particularly in the case of 201(Y)), when it is incident on the light converter 201. The emission light 203*b* is reflected by the disc substrate 202 and the emission light 203*b* is collected by a lens system (not shown). Typically, the disc substrate 202 is rotated during use, although this device can be used in a static (non-rotating) configuration, in which case it may not be known as a phosphor wheel.

Improving the performance, especially in terms of efficiency, output power and temperature management of light converters, particularly for use in phosphor wheels, is a significant challenge. One way in which this challenge is being addressed is by replacing PIS-type light conversion layers with solid-state light conversion materials, such as ceramic converters or phosphor glass. However, PIS-type materials have advantages over such solid-state light conversion materials. For example, they may allow a more flexible choice of colours, a simpler structure and lower cost. It would be advantageous to provide performance improvements without changing the type of light conversion layer being used.

SUMMARY OF THE INVENTION

Against this background, there is provided a light converter in accordance with claim 1 and an optical device in line with claim 12. There is also provided a method of manufacturing a light converter in line with claim 14. Other preferred features are disclosed with reference to the claims and in the description below.

It has been recognised that light converter comprising at least one optical coating on a light conversion layer, in which the light conversion layer comprises light conversion particles (for instance, phosphor powder) in a binding material (for example, a polymer such as silicone) may be advantageous. A planarization layer is advantageously provided on a surface of the light conversion layer. The optical coating is beneficially provided as part of or on a surface of the planarization layer. The surface of the planarization layer (adjacent the at least one optical coating) is optically smooth and/or relatively smooth in comparison with the surface of the light conversion layer (adjacent the planarization layer).

A light conversion layer formed of phosphor particles in a binder may have a rough surface and it may be difficult to coat this surface with such an optical coating. The planarization layer has a smoother surface, for instance an optically smooth surface, on which the optical coating (or coatings) can be applied more readily. For instance, it may have a roughness average (Ra) of no greater than 0.02 μm. The planarization layer may comprise comprises a silicone material, an organic material or a composite material.

The planarization layer may be deposited by dispensing, spraying, brushing, sputtering, spin coating or silk or screen printing. Preferably, the planarization layer is cured, in particular by thermal curing. The thermal curing may be at a low temperature, for instance no greater than 150 C and/or for a long time, for example at least 1 or 2 hours. This may allow the planarization layer to form as a smooth layer without affecting the light conversion layer beneath.

The optical coating may be a thin film coating such an anti-reflective (AR) coating, a high-reflective (HR) coating, a dichroic filter (DF) coating and/or a metallic coating. An optical coating may improve the performance of the light converter (in terms of efficiency) by 5%, whilst reducing the operating temperature significantly, for instance by around 9 C.

BRIEF DESCRIPTION OF THE DRAWINGS

The invention may be put into practice in a number of ways, and preferred embodiments will now be described by way of example only and with reference to the accompanying drawings, in which:

FIG. 1 schematically depicts a cross-section view of an existing exemplary light converter;

FIG. 2a shows a first example, known phosphor wheel structure comprising a light converter in accordance with FIG. 1;

FIG. 2b shows a second example, known phosphor wheel structure comprising a light converter in accordance with FIG. 1;

DETAILED DESCRIPTION OF PREFERRED EMBODIMENTS

Figure 3:
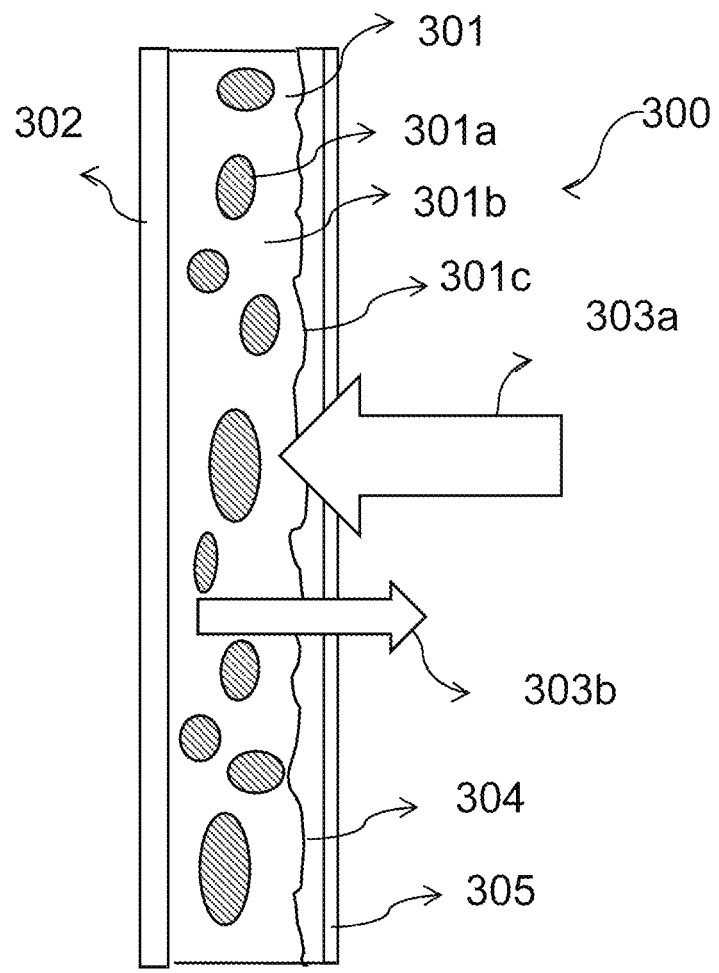
FIG. 3 schematically illustrates a cross-section view of a first light converter embodiment in accordance with the disclosure.

Referring first to FIG. 3, there is schematically illustrated a cross-section view of an embodiment of a light converter 300. There is shown: a light conversion layer 301; a highly reflective coating layer 302; a planarization layer 304; and an optical coating 305.

The light conversion layer 301 is formed on the highly reflective coating layer 302. In line with the known embodiment shown in FIG. 1, the light conversion layer 301 comprises phosphor particles (powder) 301a in a polymer binder, such as cured silicone glue 301b. In other words, this light conversion layer 301 is of phosphor-in-silicone (PIS) type. The light conversion layer 301 has a granular, rough surface 301c on one side opposite to that on which the highly reflective coating 302 is provided. As shown in FIG. 3, excitation light 303a is incident on the light conversion layer 301, which converts this into light of a different wavelength, then reflected by the highly reflective layer 302 to provide emission light 303b.

The planarization layer 304 is deposited on rough surface 301c of the light conversion layer 301. The planarization layer 304 is a silicone adhesive. The application and/or thickness of the planarization layer 304 is controlled so that an optical surface (optically smooth) is achieved in microscopic dimensions. For example, the roughness average (Ra) of the planarization layer 304 may be less than 0.02 82 m. The thickness of the planarization layer 304 can be made sufficient to make this layer optically smooth, for example 400 nm to 1000 nm or as thick as up to (and optionally including) 100 μm, 150 μm or 200 μm (400 nm, 1 μm, 100 μm or 150 μm may optionally be minimum thicknesses). It is cured to provide a firm, dry surface for better handling. Thermal curing at temperature under 150 C for 1 or 2 hours is used. This temperature limitation is particularly to avoid damaging the light conversion layer 301 beneath.

The optical coating 305 is a thin film coating, such as an anti-reflective, AR, coating. This is applied after the planarization layer 304 has been cured. PVD is used to apply this coating. The AR coating 305 is applied on the side of the light conversion layer 301 to be exposed to the excitation light 303a. This is intended to reduce the reflection loss of excitation light 303a at the interface with the light conversion layer 301. The thickness of this coating is based on the design performance, the thin-film materials used and the properties of the adjacent materials, such as the planarization layer 304.

The planarization layer 304 and optical coating 305 can provide a further, secondary benefit. The planarization layer 304 has a low refractive index, typically lower than that of the light conversion layer 301. This increases the angle of emission light 303b collection into and/or light emergence from the light conversion layer 301 (to at least 30 degrees relative a normal to the surface). Therefore, the total extraction of converted light is improved.

In practice, the combination of the above effects has been demonstrated to provide an improvement of 5% in performance and to reduce the temperature of the PIS light conversion layer 201 by 9 C. This can allow PIS-type light converters to be used more effectively and avoid problems associated with other types of light converter.

It will be noted that the highly reflective coating layer 302 is optional and an embodiment without such a layer is discussed below. Also, the structure of the light conversion layer 301 may be varied to any type of particle-in-binder configuration. Such structures tend to form with a rough outer surface, which may cause problems if an optical coating is applied.

The planarization layer 304 need not be formed from silicone. Desirable properties for this layer may include one of more of: low absorption; high transmission (at least 50%, 60%, 70%, 75%, 80%, 85%, 90% or 95%) in a wide band (380 nm to 800 nm); capable of forming an optically smooth surface readily; low cost; easy to manufacture. Other materials, especially comprising $SiO_2$ and/or $Al_2O_3$ may be used. In some cases, the refractive index of the planarization layer 304 could be less than that of the light conversion layer 201 and optionally it is as low as possible (less than 1.3, 1.25, 1.2, 1.1 or 1.05), whilst still allowing a reliable optical film to be formed upon it. The refractive index may be set dependent on the optical coating being used and a high refractive index may be preferred when an AR coating is used.

Advantageously, the refractive index of the planarization layer 304 may be set to be close to or match that of the light conversion layer 301. For example, a YAG phosphor has a high refractive index of 1.7 or more. The phosphor distributed in a silicone resin typically has a refractive index of about 1.4 to 1.5, to form the light conversion layer 301. Due to the difference in refractive indices, a considerable proportion of light may be scattered at the interface between these layers.

Although the planarization layer 304 is preferred to have a specific refractive index, an alternative approach is for an optical coating to be formed on the planarization layer 304 with the desired refractive index. Having the planarization layer 304 with a low refractive index that is unified in both functions of TIR and suitably for application of a coating provides a significant advantage. The planarization layer 304 may be formed by any silicone adhesive process (such as spraying) but alternatives may include dispensing, brushing, sputtering, spin coating or silk or screen printing. Sol-gel/dip coating, CVD, magneto sputtering PVD (which may provide good film density) or other techniques may alternatively be used for depositing the planarization layer. Instead of thermal curing, room temperature vulcanisation (RTV) may be used.

Additional or alternative types of optical coating may be provided on the planarization layer 304, such as: a highly-reflective (HR) coating (not typically used); a dichroic filter (DF) coating (for filtering the excitation and/or emission light); and/or a metallic coating (such as, such as AlFlex™ or SilFlex™, again not typically used). Dip coating may be used in addition or as an alternative to PVD to apply the optical coating. Other known techniques may be possible.

In general terms, there may be provided a light converter, comprising: a light conversion layer, comprising light conversion particles in a binding material, for generating emission light from excitation light incident on the light conversion layer; and a planarization layer on a surface of the light conversion layer. A surface of the planarization layer is optically smooth and/or smoother than the surface of the light conversion layer. At least one optical coating is beneficially part of or on the smooth surface of the planarization layer. In other words, the surface of the planarization layer has a roughness that is lower than a specific value and/or than a roughness of the surface of the light conversion layer (adjacent the planarization layer). The optical coating can then be applied to the planarization layer or formed together with the planarization layer.

Additionally or alternatively, there may be considered a method of manufacturing a light converter, comprising: depositing a planarization layer on a surface of a light conversion layer, the light conversion layer comprising light conversion particles in a binding material and generating emission light from excitation light incident on the light conversion layer; and applying at least one optical coating to or forming at least one optical coating in a surface of the planarization layer. The surface of the planarization layer is beneficially relatively smooth in comparison with the surface of a light conversion layer. This method may have steps for providing any of the features described herein with respect to the light converter.

In a different approach, the surface of the light conversion layer could have a roughness as described herein with reference to the planarization layer. This might be achieved by smoothing the (PIS) light conversion layer surface, for example by dispensing and/or curing appropriately and moulding before final solidification of the (silicone) material. In such an approach, no planarization layer would be necessary. The optical coating, for example a silicon dioxide coating of about 1 μm thickness, could then be deposited directly on the light conversion layer surface. However, it has been found that this approach is difficult to implement in manufacturing and the performance is not as good as when an additional planarization layer is provided.

The light conversion particles are typically phosphor particles. The binding material is preferably a polymer. For example, it may comprise a silicone material. The planarization layer may comprise (or be formed from) the same material as the binding material.

The surface of the planarization layer is typically configured to be optically smooth. This may be over a wide angle of light incidence (at least 5, 10, 15, 20, 25, 30, 35, 40 or 45 degrees from the surface) and/or a wide range of wavelengths (380 nm to 800 nm or at least the wavelength of excitation light and/or emission light). For example, it may have a roughness average (Ra) of no greater (or less) than 0.03 μm, 0.025 μm, 0.02 μm, 0.015 μm, 0.01 μm or 0.005 μm. The surface of the planarization layer may have a Ra that is no more than 0.5, 0.4, 0.3, 0.25, 0.2, 0.1 or 0.05 of a Ra of the surface of the light conversion layer. Additionally or alternatively, the surface of the planarization layer may have a Ra that is no more than 0.3, 0.25, 0.2, 0.1, 0.05 or 0.01 of a wavelength of the excitation light or emission light.

The planarization layer can have an optical refractive index that is lower than, similar to, or greater than that of the light conversion layer. Typically, the difference between the refractive index of the planarization layer and the refractive index of the light conversion layer should be less (or no more) than 50%, 40%, 30%, 25%, 20%, 15%, 10% or 5% of the refractive index of the light conversion layer. Additionally or alternatively, the optical refractive index of the planarization layer may, in some embodiments be less (or no more) than and in other embodiments greater than (or at least) 1.7, 1.6, 1.5, 1.4, 1.3, 1.25, 1.2, 1.1 or 1.05. The planarization layer may comprise a silicone material, an organic material or a composite material. It may comprise $SiO_2$ and/or $Al_2O_3$. The planarization layer may be deposited by any one or more of: dispensing, spraying, brushing, sputtering, silk printing or screen printing. The planarization layer may further be cured, for instance by thermal curing or room temperature vulcanisation (RTV). The thermal curing may be at a temperature no greater (or less) than 150 C. The duration of the thermal curing may be around or at least 1 or 2 hours.

The at least one optical coating preferably comprises a thin film coating. The at least one optical coating may comprise one or more of: an anti-reflective (AR) coating; a high-reflective (HR) coating; a dichroic filter (DF) coating; and a metallic coating.

The planarization layer is on a first surface of the light conversion layer. The light converter may further comprise an optically functional layer on a second surface of the light conversion layer (typically opposite the first surface of the light conversion layer). For example, the optically functional layer may comprise a highly reflective material or a reflective resin layer.

The light converter is preferably implemented as part an optical device. In particular, the optical device may comprise a substrate. Then, the light converter may be provided on (mounted on or attached to) the substrate. The substrate may comprise (or be formed of) a metal material, a non-metallic material or a composite material. In particular, the optical device may be one of: a colour wheel; a phosphor wheel; a projection display; and an automotive headlight.

Figure 4:
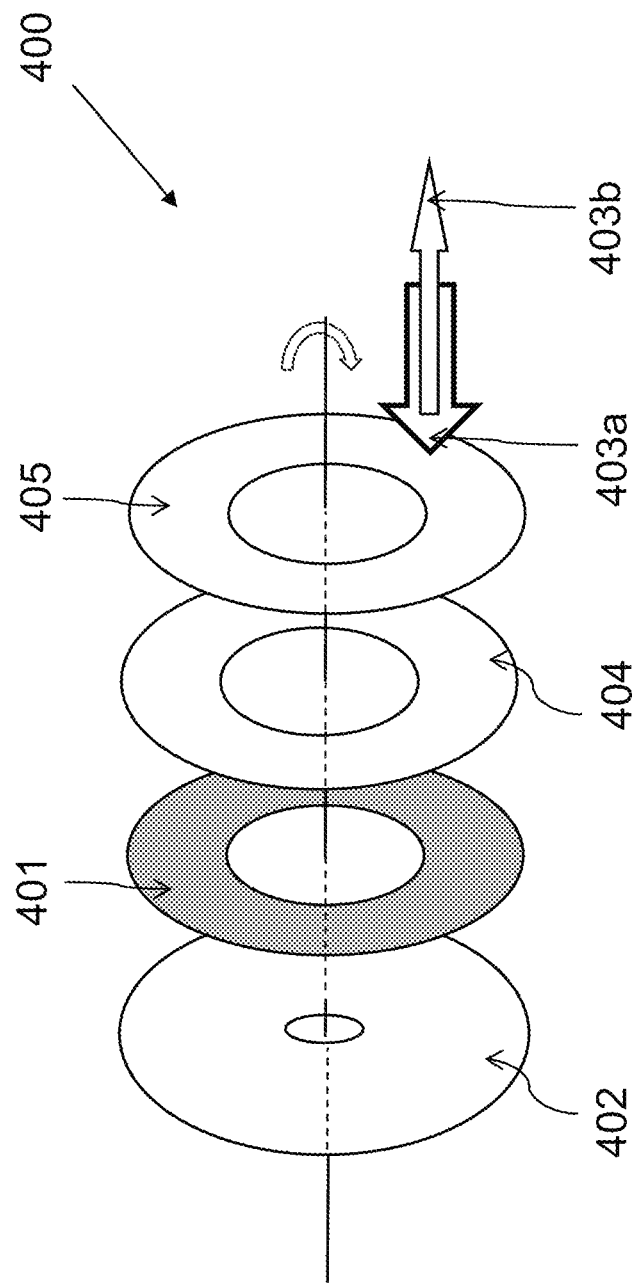
FIG. 4 depicts an exploded schematic of a first phosphor wheel embodiment.

Referring next to FIG. 4, there is depicted an exploded schematic of a first phosphor wheel 400 embodiment. This comprises: a substrate 402; a light conversion layer 401; a planarization layer 404; and an optical coating 405. The substrate 402 is a metal disk, coating with a highly reflective film. The light conversion layer 401 is of PIS type (as discussed above) and is typically applied to the substrate 402 by dispensing, screen printing or another coating method. The layer is then thermally cured and solidified to form colour segments or a colour ring. The planarization layer 404 is formed of silicone to provide an optically smooth surface on which the optical coating, which is an AR and/or DF coating, is applied. The constructed colour/phosphor wheel module is mounted on a motor to rotate with high speed. The formation of the light conversion layer 401, planarization layer 404 and optical coating 405 is in accordance with that described for FIG. 3.

Although specific embodiments have been described, the skilled person will understand that variations and modifications are possible. For example, any of the alternatives described above with reference to the light converter of FIG. 3 may equally be applied to the embodiment of FIG. 4. Other shapes and/or materials for the substrate 402 may be considered. Moreover, the substrate need not have a highly reflective film. It may be a metallic, reflective substrate. Alternatively, no reflective layer may be provided on the side of the light conversion layer 401 opposite to that of the planarization layer 404. The substrate may be (fully or partially) optically transparent. Then, the colour/phosphor wheel may be of a transmissive type. The substrate 402 need not be mounted on a motor and/or rotated. Instead, it may be used in a static (non-rotating) configuration.

Another alternative implementation may combine the planarization layer and optical coating as one layer. If the planarization layer is chosen to have a refractive index roughly half-way between the two surrounding media (that is the wavelength conversation layer below, typically phosphor in silicon, and air above respectively), with a judicious choice of thickness for this layer, a layer could be formed which is both smooth and a single layer AR coating. Additionally or alternatively, if the planarization layer were made thin enough, it could become part of the thin film stack, for instance making it part of the AR coating design. Its index and thickness may then be controlled as needed by the AR coating design.

Figure 5:
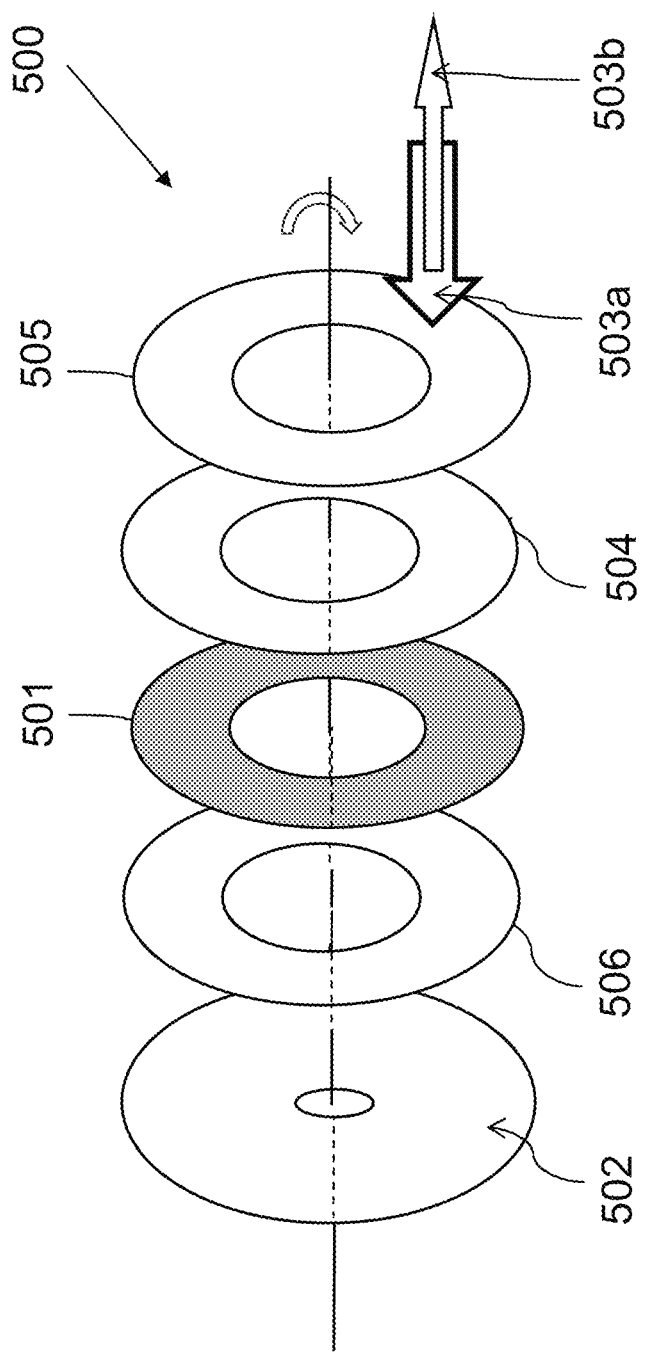
FIG. 5 depicts an exploded schematic of a second phosphor wheel embodiment.

Now referred to FIG. 5, there is depicted an exploded schematic of a second phosphor wheel embodiment. The phosphor wheel 500 comprises: a substrate 502; a light conversion layer 501; a planarization layer 504; an optical coating 505; and a highly reflective silicone layer 506. The highly reflective silicone layer 506 may be considered a reflective resin layer, as described in our co-pending International (PCT) patent application no. PCT/CN2015/097366, the contents of which are incorporated herein by reference. The embodiment of FIG. 5 may be considered an implementation of the light converter of this disclosure in combination with the reflective resin layer as described in the co-pending patent application.

The highly reflective silicone layer 506 is a silicone material, sold under the name CI-2001 by Dow Corning Corporation. Further information about this material may be found on its Technical Data Sheet and Safety Data Sheet, the contents of which are incorporated by reference. The main constituent of this material is octamethyltrisiloxane (which is a reflective resin) and it also comprises: titanium dioxide (concentration around 20 to 30%, Refractive Index 2.1); silicon dioxide (around 1 to 5%, RI 1.47); and aluminum hydroxide (around 1 to 5%, RI 1.8). These additional constituents may be further active ingredients for light diffusive reflection. This material cures at room temperature to a tough, resilient and non-tacky surface and has low flammability, although a mild heat acceleration (after solvent flash-off) can speed in-line processing. The material also has a low viscosity that enhances flow and fills in narrow gaps and spaces. Typically, a suitable material should be operational over a temperature range of −45 to 200° C. (−49 to 392° F.) for long periods of time (at least 1500 hours). However, at the low- and high temperature ends of the spectrum, behaviour of the materials and performance in particular applications can become more complex and require additional considerations. Factors that may influence performance are configuration and stress sensitivity of components, cooling rates and hold times and prior temperature history. At the high-temperature end, the durability of the cured silicone elastomer is time and temperature dependent.

The silicone material is mixed with an organic solvent before coating, which in this case comprises methyl siloxane and is sold by Dow Corning Corporation under the name OS-20. Further information about this material may be found on its Technical Data Sheet and Safety Data Sheet, the contents of which are incorporated by reference. This is a volatile solvent and is used as dilution to adjust the solution viscosity. The mixed silicone material is prepared as homogeneous according to process requirements and silicon oil thinner is added to adjust the viscosity before putting this into a mixing machine to do the mix. A two-step mixing program for the mixture machine is recommended, with 600 RPM low speed for 60 s then 1200 RPM high speed for 120 s.

The silicone layer is formed on the substrate 502 by dispensing, spray coating or screen printing. Room temperature curing or room temperature vulcanization (RTV) is normally used, but the cure rate can be accelerated (and the time required to reach a tack-free state may be reduced) by mild heat. Thermal curing can alternatively be used. Atmospheric moisture may assist the cure. Adequate time for the solvent to evaporate prior to exposing to elevated temperatures in an air circulating oven should be allowed. A typical cure schedule for 3 mil (75 micron) coatings is 10 minutes at room temperature, followed by 10 minutes at 60° C. If the coating blisters or contains bubbles, additional time at room temperature is allowed for the solvent to flash off prior to oven cure. The pot life of the silicone material is dependent on the application method chosen. To extend the pot life, exposure to moisture is minimized by using dry air or dry nitrogen blanketing whenever possible. Adhesion of the silicone material typically lags behind the cure and may take up to 48 hours to build. Curing therefore forms the silicone coating layer 203. After curing, the solvent (such as OS-20) is not present in the layer. This structure generally has a high light reflectivity between wavelengths of 380 nm to 800 nm. For example, the reflectance of the disc surface can achieve 98% after curing. The typical thickness of the silicone layer to achieve a 98% reflectance is around 0.05 mm to around 0.15 mm.

More generally, the reflective resin layer may comprise a mixed inorganic-organic polymer or elastomer (and may be a layer consisting of such a polymer or elastomer). In the preferred embodiment, the reflective resin layer comprises silicone and more preferably the reflective resin layer is a silicone layer. The reflective resin layer may comprise a siloxane, such as octamethytrisiloxane. The reflective resin layer may comprise other constituent substances such as at least one further optically reflective material, but a reflective resin material should be the optically dominant and/or majority (by concentration or w/w, for instance) component of the layer. The reflective resin may form at least (or greater than) 50% of the reflective resin layer (by concentration or w/w). Other optically reflective materials that may be present can comprise or include one or more of: titanium dioxide; silicon dioxide; and aluminum hydroxide. The thickness of the reflective resin layer is generally at least (or greater than) about 0.05 mm and typically no more (or less than) about 0.15 mm and more preferably at least about 0.1 mm and/or around 0.1 mm (for example 0.08 mm or 0.09 mm to 0.11 mm or 0.12 mm).

Returning to the embodiment of FIG. 5, the light conversion layer 501 is formed as a PIS layer in the manner described above, with reference to FIG. 3. When solidified, this forms colour segments or a colour as the light conversion layer 501 on the silicone reflective layer 502. The silicone planarization layer 504 is coated and solidified on the light conversion layer 501, again as detailed with reference to FIG. 3. This forms the optical smooth surface, upon which the thin film optical coating 505 is applied, which typically comprises an AR and/or DF coating. The colour/phosphor wheel module is mounted on a motor to rotate with high speed.

In general terms, the substrate may be coated with an optically functional layer. Then, the light conversion layer may be provided on the substrate by providing the light conversion layer on the optically functional layer. The optically functional layer may be a reflective resin layer, as discussed above.

Variations on or modifications of the embodiment of FIG. 5 are also possible. For example, any of the alternatives described above with reference to the light converter of FIG. 3 and/or the colour/phosphor wheel of FIG. 4 may equally be applied to the embodiment of FIG. 5. The highly reflective silicone layer 506 may be replaced by an alternative optically functional layer. This layer may be highly reflective and/or made of a material other than silicone. The optically functional layer (whether a silicone layer or otherwise) may be applied to the substrate 502 by other coating methods, for instance any of those discussed above with reference to the application of light conversion and/or planarization layers.

Figure 6:
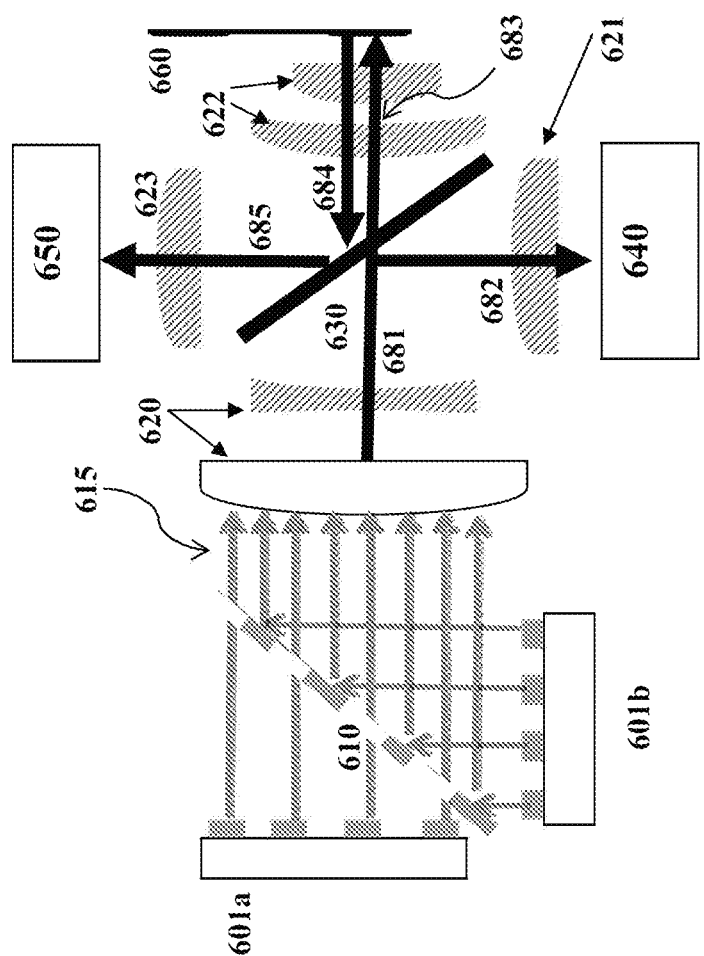
FIG. 6 illustrates a schematic of a configuration for testing the phosphor wheel embodiments of FIGS. 4 and 5.

Referring now to FIG. 6, there is illustrated a schematic of a configuration for testing the phosphor wheel embodiments of FIGS. 4 and 5. This configuration comprises: first laser diode bank 601a; second laser diode bank 601b; filter 610; lens system 620, 621, 622, 623; dichroic mirror 630; monitor power meter 640; output power meter 650; and phosphor wheel 660.

The first laser diode bank 601a and second laser diode bank 601b provide light with a total power of 60 W. The light from the two laser diode banks 601a and 601b is directed, via filter 610, to provide input light 615 to a first lens system 620. The output light 681 from the first lens system 620 is incident on the dichroic mirror 630. The output light 681 is split into: measurement light 682, which is provided to the monitor power meter 640 via second lens system 621; and test light 683, which is provided as excitation light to the phosphor wheel 660 via third lens system 622. The emission light 684 from the phosphor wheel 660 is returned to the dichroic mirror 630, where it is reflected to provide input light 685 to the output power meter 650 via a fourth lens system 623. By comparing the measurement from the monitor power meter 640 and the output power meter 650 an efficiency performance for the phosphor wheel can be identified, which can be compared with other phosphor wheels for illustrative purposes. Using such a configuration, the 5% performance improvement between an implementation in accordance with FIG. 2a and an implementation in accordance with FIG. 4 was observed.

The invention claimed is:

1. A light converter comprising:
   a light conversion layer comprising light conversion particles in a binding material, the light conversion particles generating emission light from excitation light incident on the light conversion layer, wherein the light conversion particles comprise phosphor and the binding material comprises a silicone material;
   a planarization layer on a surface of the light conversion layer wherein the planarization layer comprises a silicone material or an organic material and has a thickness of 400 nm to 1000 nm, wherein the planarization layer has a refractive index that is less than or equal to a refractive index of the light conversion layer, and wherein the difference between the refractive index of the planarization layer and the refractive index of the light conversion layer is less than 15% of the refractive index of the light conversion layer; and
   at least one optical coating as part of or on a surface of the planarization layer that is relatively smooth in comparison with the surface of the light conversion layer.
2. The light converter of claim 1, wherein the difference between the refractive index of the planarization layer and the refractive index of the light conversion layer is less than 10% of the refractive index of the light conversion layer.
3. The light converter of claim 1, wherein the surface of the planarization layer has a roughness average, Ra, that is no more than 0.25 of a Ra of the surface of the light conversion layer.
4. The light converter of claim 1, wherein the surface of the planarization layer has a roughness average, Ra, that is no greater than 0.02 μm.
5. The light converter of claim 1, wherein the surface of the planarization layer has a roughness average, Ra, that is no more than 0.1 of a wavelength of the emission light or excitation light.
6. The light converter of claim 1, wherein the at least one optical coating is provided on the surface of the planarization layer that is relatively smooth in comparison with the surface of the light conversion layer and the at least one optical coating comprises one or more of: an anti-reflective, AR, coating; a high-reflective, HR, coating; a dichroic filter, DF, coating; and a metallic coating.
7. The light converter of claim 1, wherein the planarization layer is on a first surface of the light conversion layer, the light converter further comprising:
   an optically functional layer on a second surface of the light conversion layer, wherein the second surface of the light conversion layer is opposite the first surface of the light conversion layer.
8. The light converter of claim 7, wherein the optically functional layer comprises a reflective resin material.
9. The light converter of claim 1, wherein the difference between the refractive index of the planarization layer and the refractive index of the light conversion layer is less than 5% of the refractive index of the light conversion layer.
10. The light converter of claim 1, wherein the planarization layer has a refractive index that is greater than 1.2.
11. A light converter comprising:
    a light conversion layer comprising light conversion particles in a binding material, the light conversion particles generating emission light from excitation light incident on the light conversion layer, wherein the binding material comprises a polymer material;
    a planarization layer on a surface of the light conversion layer wherein the planarization layer comprises a polymer material or an organic material and has a thickness of 400 nm to 1000 nm, wherein the planarization layer has a refractive index that is less than or equal to a refractive index of the light conversion layer, and wherein the difference between the refractive index of the planarization layer and the refractive index of the light conversion layer is less than 15% of the refractive index of the light conversion layer; and
    at least one optical coating as part of or on a surface of the planarization layer that is relatively smooth in comparison with the surface of the light conversion layer.
12. The light converter of claim 11, wherein the difference between the refractive index of the planarization layer and the refractive index of the light conversion layer is less than 10% of the refractive index of the light conversion layer.
13. The light converter of claim 11, wherein the surface of the planarization layer has a roughness average, Ra, that is no greater than 0.02 μm.
14. The light converter of claim 11, wherein the surface of the planarization layer has a roughness average, Ra, that is no more than 0.25 of a Ra of the surface of the light conversion layer, and/or wherein the surface of the planarization layer has a roughness average, Ra, that is no more than 0.1 of a wavelength of the emission light or excitation light.

15. The light converter of claim 11, wherein the polymer material of the binding material comprises silicone and/or the polymer material of the planarization layer comprises silicone.

16. The light converter of claim 11, wherein the at least one optical coating is provided on the surface of the planarization layer that is relatively smooth in comparison with the surface of the light conversion layer and the at least one optical coating comprises one or more of: an anti-reflective, AR, coating; a high-reflective, HR, coating; a dichroic filter, DF, coating; and a metallic coating.

17. The light converter of claim 11, wherein the light conversion particles are phosphor particles.

* * * * *